(12) United States Patent
Carnes

(10) Patent No.: US 8,739,493 B2
(45) Date of Patent: Jun. 3, 2014

(54) INTERLOCKING JOINT SYSTEM FOR EMERGENCY STRUCTURES

(75) Inventor: Todd Jackson Carnes, Franklin, NJ (US)

(73) Assignee: Todd Carnes, Franklin, NJ (US)

(*) Notice: Subject to any disclaimer, the term of this patent is extended or adjusted under 35 U.S.C. 154(b) by 0 days.

(21) Appl. No.: 13/586,837

(22) Filed: Aug. 15, 2012

(65) Prior Publication Data

US 2014/0047791 A1 Feb. 20, 2014

(51) Int. Cl.
*E04C 2/38* (2006.01)
*F16B 12/36* (2006.01)

(52) U.S. Cl.
USPC .......................... 52/655.1; 52/586.1; 403/294

(58) Field of Classification Search
CPC ............ E04B 1/585; E04B 2001/1927; E04B 2001/2406; E04B 1/6116; E04B 1/6162; E04B 2001/1966; E04B 2001/2424
USPC ................ 52/81.3, 79.9–79.12, 653.2–655.1; 403/294, 378, 279.4, 279.5, 360
See application file for complete search history.

(56) References Cited

U.S. PATENT DOCUMENTS

| | | | | |
|---|---|---|---|---|
| 2,839,320 A * | 6/1958 | Hill | | 403/172 |
| 4,299,067 A * | 11/1981 | Bertschi | | 52/127.12 |
| 4,647,241 A * | 3/1987 | Weber | | 403/18 |
| 4,691,818 A * | 9/1987 | Weber | | 198/666 |
| 4,706,367 A * | 11/1987 | Garringer | | 29/525.05 |
| 4,958,953 A * | 9/1990 | Charondiere | | 403/297 |
| 5,326,337 A * | 7/1994 | Pardella | | 482/36 |
| 5,421,666 A * | 6/1995 | Spears | | 403/176 |
| 5,624,160 A * | 4/1997 | Koch et al. | | 297/452.2 |
| 5,943,837 A * | 8/1999 | Esser et al. | | 52/646 |
| 6,116,437 A * | 9/2000 | Rowe | | 211/189 |
| 7,341,391 B2 * | 3/2008 | Nakahori et al. | | 403/27 |
| 8,342,771 B2 * | 1/2013 | Goad | | 403/292 |
| 8,371,768 B1 * | 2/2013 | Wu | | 403/294 |
| 8,528,291 B2 * | 9/2013 | Allred et al. | | 52/655.1 |
| 2004/0101354 A1 * | 5/2004 | Nakahori et al. | | 403/169 |

* cited by examiner

*Primary Examiner* — Elizabeth A Plummer

(57) ABSTRACT

An interlocking joint system can be used to build emergency shelters. The system provides emergency structures that can be assembled by anyone but still handle heavy weather. The system also provides an armorable air droppable structure for military. Shelters built with the system require no tools or special training and such shelters typically become stronger as more force is applied to the joints. The shelter design laterally redirects how wind load and weight load affects the structure.

7 Claims, 3 Drawing Sheets

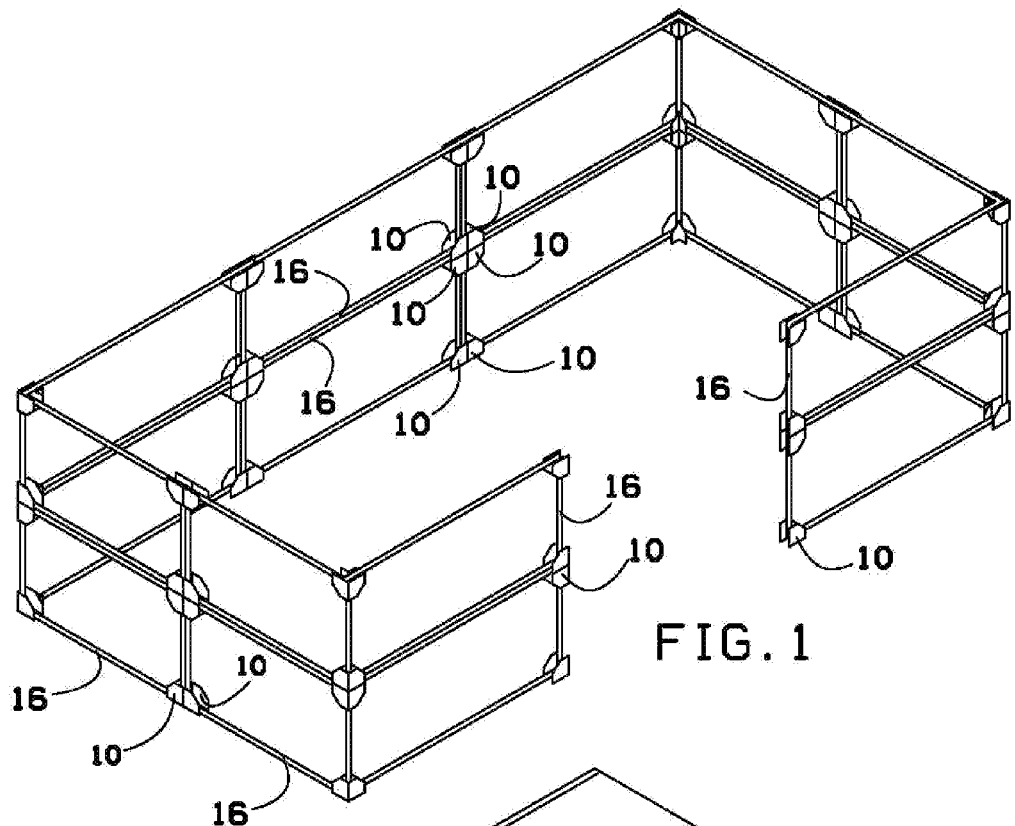
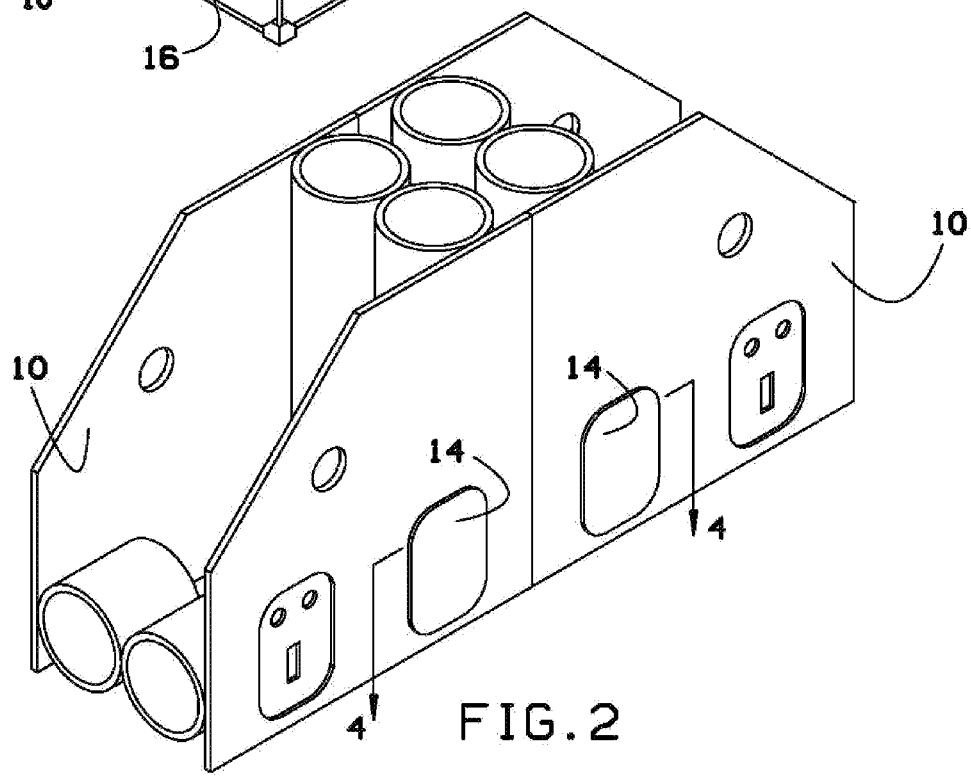

INTERLOCKING JOINT SYSTEM FOR EMERGENCY STRUCTURES

BACKGROUND OF THE INVENTION

The present invention relates to emergency structures and building materials for building the same and, more particularly, to an emergency structure that includes an interlocking joint system that is simple to assembly, strong when assembled, and required no special tools.

There is currently a lack of a good emergency structure that can be assembled by anyone, but handle heavy weather. Moreover, distribution of structures during a time of need can be difficult. They are often not easily transportable, or cannot be easily transported.

As can be seen, there is a need for an improved emergency structure that is easy to assembly, weather-proof, strong, requires no special tools and can be easily shipped and transported to a location of need.

SUMMARY OF THE INVENTION

In one aspect of the present invention, an interlocking joint system for building a structure comprises a wall joint member having parallel side members sandwiching a plurality of tubular members therebetween; a slug operable to joint one of the wall joint members to another one of the wall joint members; a locking groove disposed about each end of the slug; and retention tabs operable to be disposed on the wall joint and retain the slug within tubular members of adjacent wall joint members.

In another aspect of the present invention, a interlocking joint system for building a structure comprises a wall joint member having parallel side members sandwiching a plurality of tubular members therebetween; a slug operable to joint one of the wall joint members to another one of the wall joint members; a locking groove disposed about each end of the slug; retention tabs operable to be disposed on the wall joint and retain the slug within tubular members of adjacent wall joint members; and wall structural members extending between wall joint members, the wall structural members forming a support for a wall of a structure, wherein tools are not required to assembly the structure from the interlocking joint system.

In a further aspect of the present invention, a method for building a structure comprises joining together wall joint members with one or more slugs, the wall joint members having parallel side members sandwiching a plurality of tubular members therebetween, the slugs having locking grooves disposed about each end thereof; inserting retention tabs on the wall joints, the retention tabs extending into the tubular members and operable to engage the locking grooves of the slugs to retain the slug within tubular members of adjacent wall joint members; running wall structural members between wall joint members, the wall structural members operable to support a wall of the structure.

These and other features, aspects and advantages of the present invention will become better understood with reference to the following drawings, description and claims.

BRIEF DESCRIPTION OF THE DRAWINGS

FIG. 1 is a perspective view of a structure assembled with the interlocking joint system according to an exemplary embodiment of the present invention;

FIG. 2 is a perspective view of two adjacent joint members according to an exemplary embodiment of the present invention;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an interlocking joint system that can be used to build emergency shelters. The system solves two major issues of current systems—lack of good emergency structures that can be assembled by anyone but still handle heavy weather, and armorable air droppable structure for military. Shelters build with the system of the present invention requires no tools or special training and such shelters are typically stronger as more force is applied to the joints. The shelter design laterally redirects how wind load and weight load affects the structure. Sheer force can be redirected into pull force. This redirected force allows for a wide range in materials that can be used at lower cost and even recyclable materials.

The system of the present invention allows for non-traditional building materials, such a fiberglass, to be used in permanent building structures. The structure performance is multi-directional in that both lateral and horizontal strength are increased, allowing the structure to withstand higher winds and loads as compared to conventional structures. By reducing the number of parts needed to build the structure, the system tends to be economical.

Figure 3:
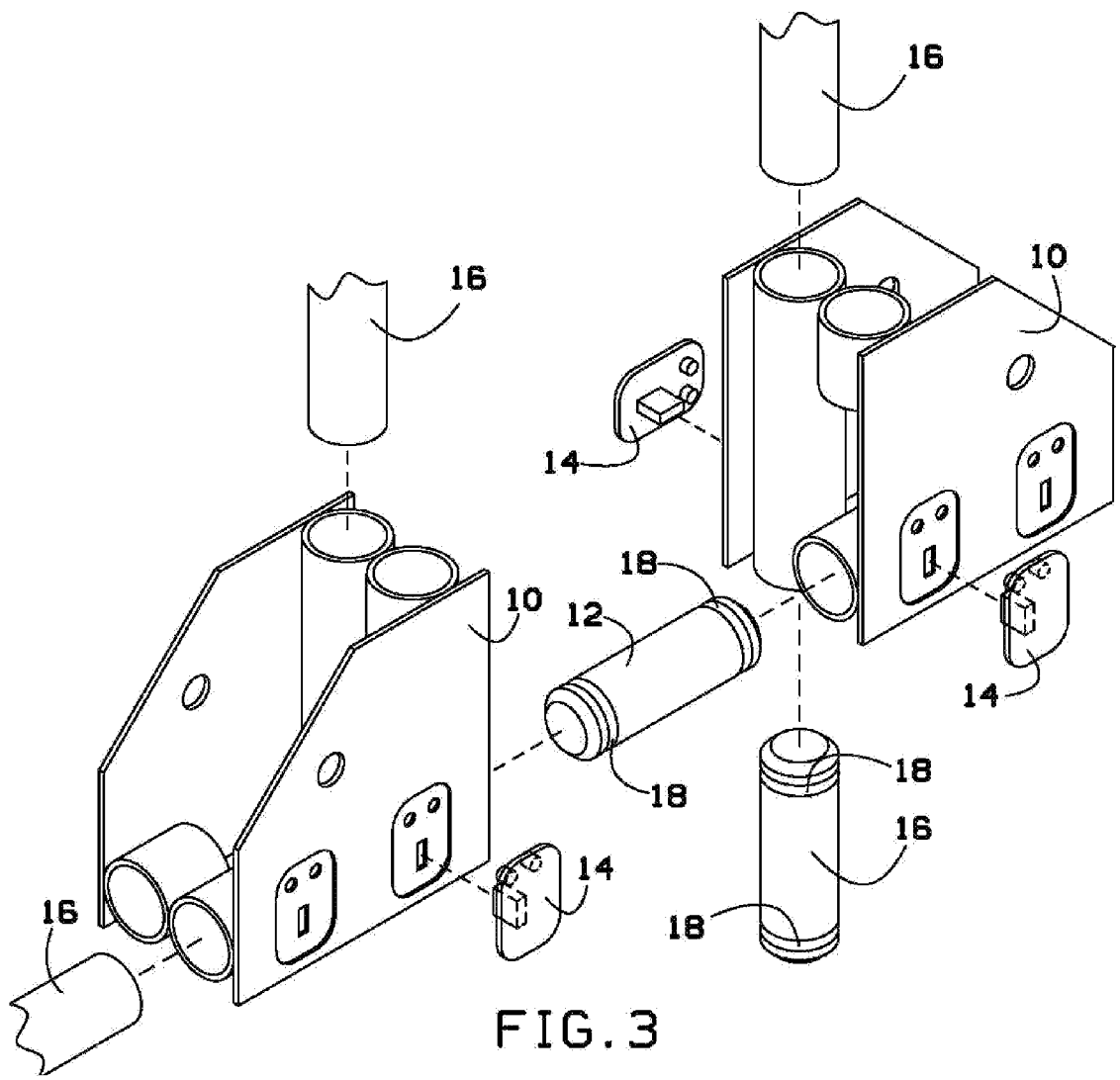
FIG. 3 is an exploded perspective view of a joint in the structure of FIG. 1.
Figure 4:
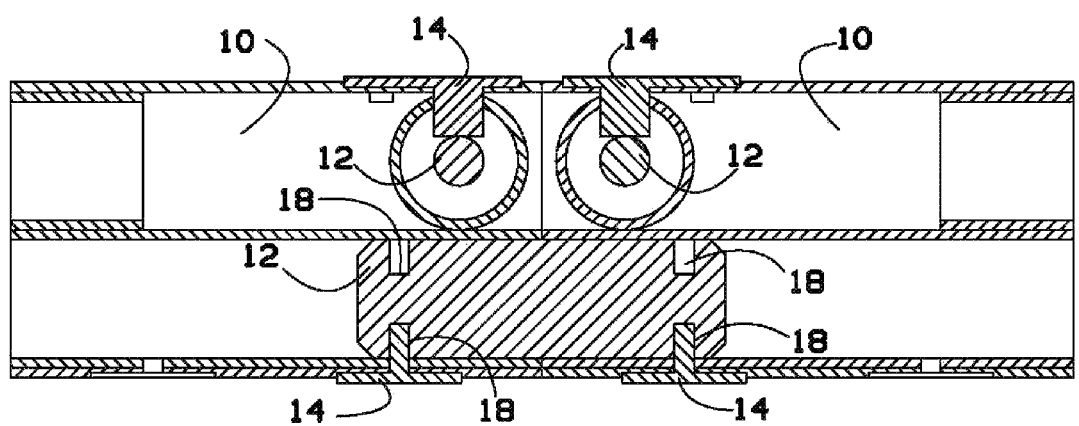
FIG. 4 is a cross-sectional view of the two adjacent joint members as taken along line 4-4 of FIG. 2.

Referring now to FIGS. 1 through 4, a wall joint member 10 can use slugs 12 to hold multiple wall joint members 10 together. The slugs 12 can be rigid or flexible and take the stress from wind and/or weight loads. The wall joint members 10 can include parallel side members with a plurality of tubular members sandwiched therebetween. The tubular members can hold the slugs 12 and can also be designed to hold wall structural members 16.

A retention tab 14 can be inserted into the wall joint member 10 to engage with locking grooves 18 cut in the slugs 12. The retention tabs 14 keep the slug 12 from moving with the joint member 10. Together, they form a connection that redirects wind load, also referred to as sheer force, into pull force. This gives the connection corners and joints between walls factors stronger than conventional structures.

Wall structural members 16 can extend between adjacent wall joint members 10. The wall structural members 16 can also include locking grooves 18, where the retention tabs 14 can be used to secure the wall structure members 16 to the wall joint members 10.

The shelters of the present invention can be made with various materials, such as plastics or metals. The materials can be made by conventional processes.

The configuration can be changed unlimited in two directions and even multiple kits can be used to create larger and higher buildings with no redesign or extra parts needed. The basic kit can be used to build a structure similar to that shown in FIG. 1. Multiple kits can be used to build various structures, such as single family housing, duplex housing, barracks, bathrooms, and more.

By using the structures of the present invention, one can rebuild a destroyed community in days as opposed to months with conventional structures. The military could put actual armor on the building and even change panels in seconds. Normal homes could be built easily and stronger than conventional home building methods, which can be especially useful in high wind and earthquake-prone areas.

It should be understood, of course, that the foregoing relates to exemplary embodiments of the invention and that modifications may be made without departing from the spirit and scope of the invention as set forth in the following claims.

What is claimed is:

1. An interlocking joint system for building a structure, comprising:
   - a plurality of wall joint members having flat parallel plate members sandwiching a plurality of tubular members therebetween, wherein each flat parallel plate member has a depression;
   - a slug connecting one of the plurality of wall joint members to another one of the plurality of wall joint members;
   - a locking groove circumferentially disposed about each end of the slug;
   - a plurality of retention tabs, each of the plurality of retention tabs comprising a plate, a rectangular tongue protruding from the plate, and two alignment protrusions protruding from the plate;
   - and wherein the rectangular tongue of one of the plurality of retention tabs is inserted into the locking groove of the slug in order to retain the slug within one of the plurality of tubular members, and wherein the plate of the one of the plurality of retention tabs is received within the depression of one of the flat parallel plate members to create a flat, flush surface.

2. The interlocking joint system of claim 1, further comprising wall structural members extending between the plurality of wall joint members, the wall structural members forming a support for a wall of the structure.

3. The interlocking joint system of claim 1, wherein the structure is an emergency structure that is assembled without tools.

4. An interlocking joint system for building a structure, comprising:
   - a plurality of wall joint members having flat parallel plate members sandwiching a plurality of tubular members therebetween, wherein each flat parallel plate member has a depression;
   - a slug connecting one of the plurality of wall joint members to another one of the plurality of wall joint members;
   - a locking groove circumferentially disposed about each end of the slug;
   - a plurality of retention tabs, each of the plurality of retention tabs comprising a plate, a rectangular tongue protruding from the plate, and two alignment protrusions protruding from the plate;
   - wherein the rectangular tongue of one of the plurality of retention tabs is inserted into the locking groove of the slug in order to retain the slug within one of the plurality of tubular members, and wherein the plate of the one of the plurality of retention tabs is received within the depression of one of the flat parallel plate members to create a flat, flush surface;
   - wall structural members extending between the plurality of wall joint members, the wall structural members forming a support for a wall of the structure, wherein tools are not required to assemble the structure.

5. A method for building a structure, comprising:
   - joining together adjacent wall joint members with one or more slugs, each of the adjacent wall joint members having flat parallel plate members sandwiching a plurality of tubular members therebetween, the one or more slugs having locking grooves circumferentially disposed about each end thereof, the one or more slugs being disposed in one of the plurality of tubular member of each of the adjacent wall joint members such that none of the one or more slug is exposed;
   - inserting retention tabs on each of the adjacent wall joint members, the retention tabs each extending into one of the locking grooves of the one or more slugs to retain the one or more slug within one of the plurality of tubular members of the adjacent wall joint members, wherein each of the retention tabs comprises a flat plate, a rectangular tongue protruding from the flat plate, and two alignment protrusions protruding from the flat plate, and wherein the flat plate is placed within a depression of one of the adjacent wall joint members to form a flat, flush surface; and
   - running wall structural members between additional wall joint members and one of the adjacent wall joint members, the wall structural members operable to support a wall of the structure.

6. The method of claim 5, wherein no tools are used to assemble the structure.

7. The method of claim 5, further comprising redirecting sheer forces into pull forces on the one or more slugs.

* * * * *